United States Patent [19]

Niermeyer

[11] Patent Number: 5,695,702
[45] Date of Patent: Dec. 9, 1997

[54] THERMOPLASTIC HOLLOW FIBER MEMBRANE MODULE AND METHOD OF MANUFACTURE

[75] Inventor: J. Karl Niermeyer, Tyngsborough, Mass.

[73] Assignee: Millipore Corporation, Bedford, Mass.

[21] Appl. No.: 269,980

[22] Filed: Jul. 1, 1994

[51] Int. Cl.⁶ .................................................. B29C 47/02
[52] U.S. Cl. .......................... 264/129; 95/54; 96/8; 96/10; 156/69; 156/187; 156/192; 156/244.12; 156/244.13; 156/244.22; 156/296; 210/321.61; 210/321.8; 210/321.89; 210/500.23; 210/510.1; 210/654
[58] Field of Search ............... 210/321.8, 321.61, 210/510.1, 500.23, 321.89, 654; 264/135, 138, 139, 129; 96/8, 10; 95/54; 156/69, 187, 192, 244.12, 244.13, 244.22, 296

[56] References Cited

U.S. PATENT DOCUMENTS

| | | | |
|---|---|---|---|
| 4,231,871 | 11/1980 | Lipps et al. | 210/87 |
| 4,770,778 | 9/1988 | Yokoyama et al. | 210/500.23 |
| 4,778,601 | 10/1988 | Lopatin et al. | 21/500.27 |
| 5,284,584 | 2/1994 | Huang et al. | 210/321.61 |

FOREIGN PATENT DOCUMENTS 61-97005  5/1986  Japan ................ 210/500.23

*Primary Examiner*—Robert A. Dawson
*Assistant Examiner*—Kenneth M. Jones
*Attorney, Agent, or Firm*—Andrew T. Karnakis

[57] ABSTRACT

A hollow fiber membrane module and its method of manufacture are disclosed wherein the module is fabricated utilizing superior hollow fiber materials, namely high molecular weight (i.e. molecular weight>500,000 Daltons) polymers. In a preferred embodiment, the hollow fibers are fabricated from ultra-high molecular weight polyethylene (UPE). An array of UPE hollow fiber membranes is contacted with an extrusion of molten thermoplastic polymer at a contact temperature which is higher than the UPE membrane polymer. This high temperature application of sealing polymer does not collapse or otherwise deform the lumen of the hollow fiber, while assuring that the polymer can thus be applied with sufficiently low viscosity to provide adequate penetration around the individual fibers of the array to form an integral seal thereabout.

20 Claims, 5 Drawing Sheets

THERMOPLASTIC HOLLOW FIBER MEMBRANE MODULE AND METHOD OF MANUFACTURE

BACKGROUND OF THE INVENTION

This invention relates to hollow fiber membrane modules and more specifically, to all thermoplastic hollow fiber membrane modules and methods for manufacturing such modules.

Hollow fiber microfiltration membrane devices have found many applications in the pharmaceutical, food, beverage and semiconductor industries. These devices have the unique feature of requiring no support structures for the membrane media since, as a result of its tubular geometry, the membrane is self supporting. This feature provides numerous benefits, one of which is the ability to pack a large membrane area in a very small volume. An additional benefit is that this geometry provides a minimum of obstructions in the flow path which decreases hydraulic inefficiencies as well as reduces contamination from the support structures present in conventional devices. This latter feature is of particular value, for example, in semiconductor industry filtration applications where it is essential to maintain extremely low levels of particle contamination and extractable contaminants.

In spite of the numerous advantages that hollow fiber membrane devices possess over flat-sheet membrane devices, they have yet to be used in some critical applications. In the past, hollow fiber devices have suffered from a major disadvantage, namely, that two-part adhesive resins have been used as potting material to seal the hollow fibers into the filtration device. These resins are a persistent source of organic extractable contaminants as well as particulate matter resulting from shedding due to the gradual hydrolysis and deterioration of the adhesive resin. In addition, such resins are chemically incompatible with many organic solvents. As a result of these shortcomings, hollow fiber membrane devices have been widely used in applications involving aggressive (corrosive) chemicals, organic solvents and where purity is essential.

Another difficulty in the potting of hollow fibers is non-uniformity in the fiber bundle prior to potting. Since the adhesive resin has to flow into the bundle to form an integral seal, the more open spaces have a tendency to fill faster while the rest of the spaces remain substantially free of adhesive; this results in non-integral bundles. To alleviate this problem, an excessive amount of adhesive resin may be used but this sometimes results in wicking of the adhesive along the length of the fiber which ultimately reduces the amount of useful filtration area.

Those skilled in the art of making hollow fiber modules have therefore searched for ways to overcome these difficulties. Some manufacturers have eliminated the use of two-part adhesives by using a molten thermoplastic polymer to seal the fiber bundle; others have developed techniques to obtain a uniform spacing between fibers prior to potting. Significant effort has been directed toward forming a reliable seal around the hollow fibers which make up the module.

In order to seal a hollow fiber membrane module to prevent the fluid to be filtered from bypassing the membranes, the sealing material must completely surround the hollow fiber without damaging it (i.e. either by collapsing the lumen or by destroying the structural integrity of the walls of the fiber adjacent to the sealing area). In order to assure complete coverage when using adhesive resins, this material must have a low viscosity when it is forced into the interstitial spaces between the fibers. Thus reactive polymer solutions which are initially of low viscosity but later become a solid are used. Due to its relatively high viscosity, it is impossible to force a molten polymer into these spaces without collapsing or otherwise damaging the hollow fiber. Alternatively, lowering the viscosity requires using relatively high temperatures, typically higher temperatures than those which the hollow fibers can withstand without damage. Nonetheless, there are several prior art references which disclose processes for the fabrication of an all-thermoplastic hollow fiber module.

U.S. Pat. No. 5,015,585 (Robinson) describes a process for making a homopolymer hollow fiber module by thermal bonding techniques which first requires insertion of a metal rod into the lumen of each hollow fiber to maintain its shape and integrity during the bonding process. These strengthened hollow fibers are conventionally potted by immersing the fibers into a mold containing a suitable molten thermoplastic. Using this technique, the spaces between the hollow fibers are filled or otherwise melted while keeping the lumens of the fibers open. After bonding is completed, the rods inserted into the fibers are forced through the ends and removed; this is followed by cutting the bundle end to create a through hole for communicating with the interior of the fiber lumen. While Robinson suggests that any thermoplastic polymer can be used to produce a homopolymer module, the disadvantage with this technique is the difficulty in reliably and efficiently inserting a rod into each hollow fiber, which in a typical filtration module can amount to several thousand fibers.

U.S. Pat. Nos. 4,980,060 and 5,066,397 (Muto et al) disclose another process for thermoplastically sealing the ends of a hollow fiber filtration module by first dipping the fiber ends into an inorganic cement (e.g. gypsum) thereby filling a portion of the lumens and allowing it to set. A bundle of fibers is then gathered and the filled ends are potted using a molten thermoplastic resin. Alternatively, the filled ends may be directly fusion bonded together to form the requisite seal. The bonding step is followed by conventionally cutting of the ends and finally dissolving the cement inside the lumen ends with a suitable chemical. This technique is not universally applicable since inorganic cements must be found that do not damage the membrane either by themselves or by the solvent required for their removal. Finally, this technique is undesirable due to the difficulty of the steps involved as well as the potential contamination resulting from the inorganic cement which may not totally be removed.

U.S. Pat. No. 5,228,992 (Degen) discloses a process for enhancing the ends of thermoplastic hollow fibers, e.g. by radiation cross-linking, in order to increase the fiber's ability to withstand the high temperature inherent in injection molding techniques. The ends are subsequently potted by a conventional molding technique. The difficulty with Degen's process is that the fibers have to be specially treated at the ends to render them more stable at high temperatures. Furthermore, cross-linking is not suitable for some polymers, for example fluoropolymers.

All of the aforementioned techniques require a special treatment of the ends of the hollow fibers to render them resistant to the high temperatures necessary to pot the bundle, temperatures so high that the fiber would normally collapse or otherwise completely melt. Additionally, these techniques require that the fiber be processed as single entities rather than as a grouped array.

Other processes have been devised which focus on producing a more uniform bundle. U.S. Pat. No. 5,186,832

(Mancusi et al) discloses a method for producing a uniform bundle by first converting the hollow fibers into a fabric with the fibers transversely oriented, in a spaced-apart, mutually parallel relationship and held in place by warp filaments. The device is assembled by spirally winding the fabric made out of hollow fibers to obtain a uniformly-spaced fiber bundle. In this process the fiber bundle is sealed using conventional resinous potting material. In addition to conventional potting methods, this patent discloses a technique for simultaneously applying resinous potting material to the ends of the bundle as the woven fabric is wound rather than subsequently potting the bundle after winding. However, no mention is made of sealing the fiber ends with a molten thermoplastic polymer. In fact, this patent cautions that heat generated by exothermic resinous potting material is to be avoided, otherwise the hollow fibers may be damaged. Thus the use of adhesive resins in the process taught by the '832 patent suffers from all the disadvantages mentioned above. In addition, holding the fiber bundle together by means of warp filaments is a potential source of particulate contamination downstream of the active filter area, which is highly undesirable in certain applications such as semiconductor manufacturing processes. Also, the space resulting from the use of warp filaments results in a lower packing density and hence less active filtration area for a given bundle volume.

More recently, U.S. Pat. No. 5,284,584 (Huang et al) discloses techniques for fabricating an all thermoplastic, spirally wound hollow fiber membrane cartridge. Like the Mancusi et al patent (U.S. Pat. No. 5,186,832), Huang et al teaches first preparing a fabric array with transversely oriented warp filaments used to create a uniform spaced-apart bundle of mutually parallel fibers. Thus this patent suffers from the same disadvantages in this regard as discussed with respect to Mancusi et al. Huang et al describes details of the fabrication of tubesheets at the ends of the fiber bundle to form a fluid-tight seal around the fibers such that when the fiber bundle is fitted into a housing there will be no fluid flow which bypasses the membranes. While this patent discloses extruding a molten thermoplastic resin as the fabric array is wound on a mandrel, Huang et al teaches that the resin and the hollow fiber membrane material must be chosen so that the melting point of the molten resin must be at least 10° C., and preferably 20° C., below the melting point of the hollow fibers. More specifically, this patent teaches that the temperature of the molten resin at the point of contact with the hollow fiber must be lower than the melting point of the fiber. This limits the uses to which such membranes can be put. For example, the use temperature for a device of this sort will be limited to that established by the lower temperature resin melting point.

Thus despite numerous prior attempts, there still exists a need for improvements in the art of designing and efficiently manufacturing a reliable hollow fiber membrane module which is both chemically and mechanically robust and which has essentially no possibility of shedding undesired particulate contaminants or producing other extractables.

SUMMARY OF THE INVENTION

The present invention overcomes the limitations and disadvantages of the prior art by providing a unique hollow fiber membrane module fabricated from superior hollow fiber polymeric materials with individual membranes reliably and reproducibly sealed with chemically compatible thermoplastic polymers. Through the use of manufacturing methods designed to optimize the incorporation of these superior hollow fiber materials, an improved module can be constructed without the need for extraneous material which could create undesired particulate contaminants or without the complicated use of lumen-stiffening rods. The end product made according to the process of the invention is an all thermoplastic module having an integral bundle with reliable, fluid-tight seals. The improved hollow fiber membrane module according to the invention exhibits superior structural and chemical integrity, thermal stability, purity and cleanliness, factors which permit the device to be used in a wide variety of demanding applications, such as filters used in the manufacture of microelectronic components.

While suitable for use with a wide variety of hollow fiber-molten thermoplastic polymer systems, the preferred aspect of the present invention involves forming a plurality of hollow fiber membranes into a parallel array, with the membranes being made from high molecular weight (i.e. molecular weight>500,000 Daltons) polymers. The array is contacted with an extrusion of molten thermoplastic polymer of much lower molecular weight (e.g. molecular weight<200,000 Daltons) at a contact temperature which is higher than the melting point of the membrane polymer. The molten polymer can thus be applied with sufficiently low viscosity to assure adequate penetration of the polymer around the individual fibers of the array. At the same time, the high molecular weight hollow fiber membrane polymer assures that, despite melting of the hollow fiber wall, there will be no lumen collapse or other deformation which would violate the integrity of the hollow fiber membrane element.

In preferred embodiments, the hollow fiber polymer and the molten polymer are homopolymers, i.e., the monomer composition of the two polymers is substantially the same. Since the two polymers are chemically identical, they fuse together during the sealing cycle to form a single phase material in the tubesheet. The high degree of interpenetration resulting from applying the extruded polymer at temperatures higher than the melting point of the fiber creates a bond which is stronger than conventional sealing techniques.

In other preferred embodiments, the array is spirally wound about an axis parallel to the longitudinal axis of the hollow fibers while molten polymer is applied to the ends of the array to form an integral bundle of fibers, This bundle with its tubesheet is then suitably prepared for mounting into a cartridge.

It is an object of this invention to construct an all thermoplastic hollow fiber membrane module of robust design able to withstand high temperature and corrosive environments without compromising the cleanliness of the module thereby contaminating the filtration process.

It is a further object of this invention to describe a process which is universally applicable, especially for the manufacture of homopolymer hollow fiber membrane devices.

It is yet another object of this invention to devise a process which is reliable and easily scaleable regardless of the module or hollow fiber dimensions.

Other aspects, objects and advantages of the present invention will become apparent from the following detailed description taken together with the drawings.

DETAILED DESCRIPTION OF THE INVENTION

To meet the demands imposed on membrane separation devices in today's critical separations applications (e.g. semiconductor manufacturing), the membranes themselves must exhibit excellent chemical resistance, mechanical strength and thermal stability. This is particularly the case with filtration modules which use hollow fiber membranes as the separation element; moreover, such hollow fibers must be reliably sealed together at one or more ends prior to assembly of the module.

In accordance with the present invention, applicant has discovered that, with the proper choice of hollow fiber membrane materials, it is possible to construct a superior separation module capable of filtering, for example, high purity chemicals at elevated temperatures. The hollow fibers of the present invention are made from polymers of the high molecular weight (i.e. molecular weight>500,000 Daltons) variety. Examples of typically used polymers are: polypropylene, polyethylene and polytetrafluorethylene.

In a preferred embodiment, the hollow fiber membranes are prepared from ultrahigh molecular weight polyethylene (UPE) (i.e. molecular weight>1,000,000 Daltons) in accordance with the processes described in commonly assigned U.S. Pat. Nos. 4,778,601 and 4,828,772, whose disclosures are hereby incorporated by reference. Although there is no acknowledged universal definition of UPE, it is generally distinguished from other members of the polyethylene family, such as high density polyethylene, because UPE exhibits no measurable flow in its molten state despite the fact that UPE does undergo a certain amount of deformation when heated above its melting point. Surprisingly, applicant has found that molten UPE is able to withstand the stresses imparted during sealing without further significant deformation to the fiber and importantly without collapsing the lumen. The UPE fibers constructed as above have a pore size of from 0.05 to 10 microns, an inner diameter of 500 microns and a wall thickness of 200 microns.

Figure 1:
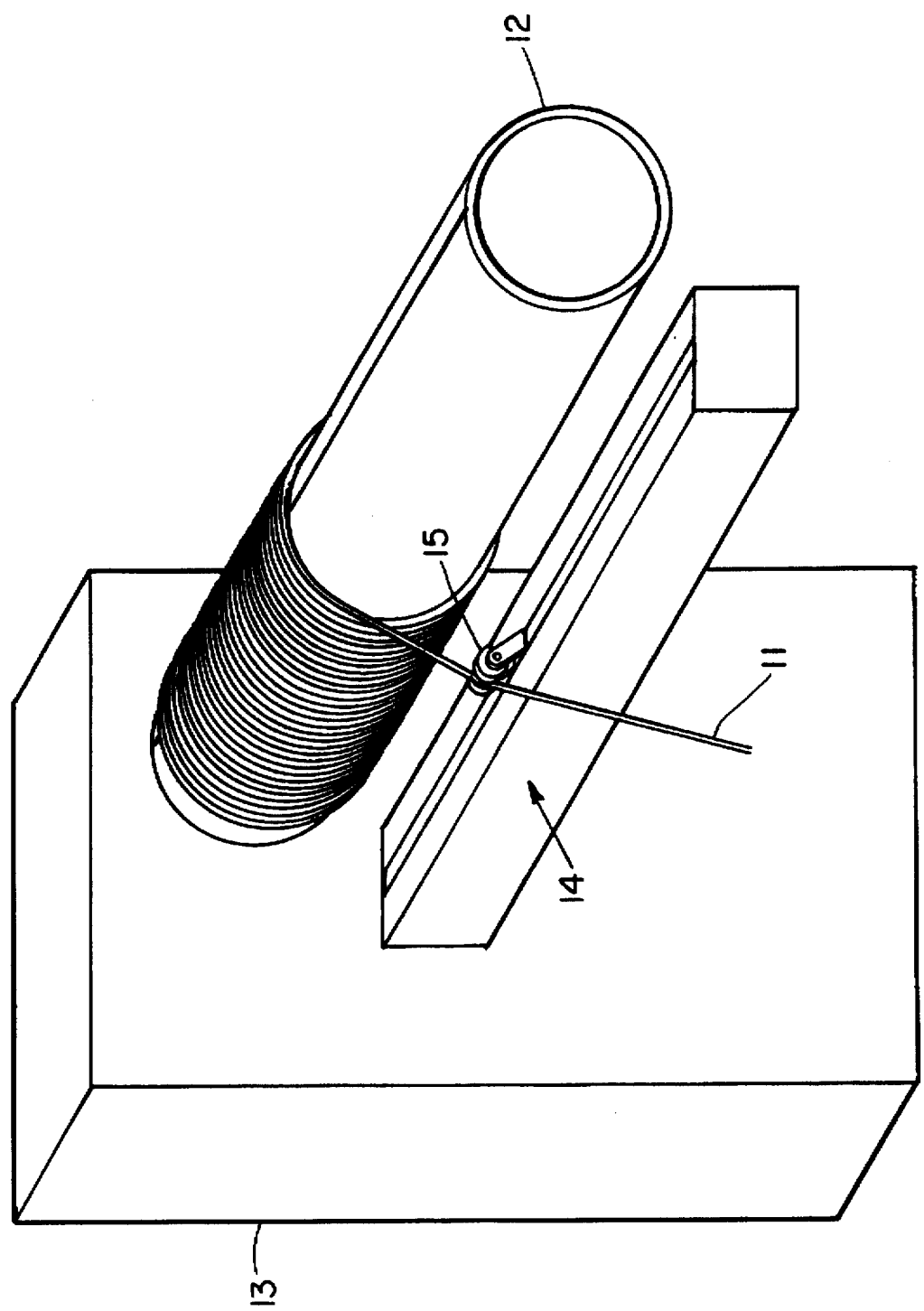
FIG. 1 is a perspective diagram of the apparatus used in the process of making an array of hollow fiber membranes in accordance with a preferred embodiment of the present invention.

The process of fabricating a hollow fiber membrane separation module according to the preferred embodiment of the invention begins with the construction of an array formed of suitable UPE hollow fiber membrane materials manufactured in accordance with the teachings of U.S. Pat. Nos. 4,778,601 and 4,828,772. The technique for forming such an array is generally shown in FIG. 1. A length of hollow fiber 11 membrane is first formed into an array 21 of individual membrane elements arranged substantially parallel to one another. In the fabrication of the array, care must be taken to minimize contamination of the hollow fiber membranes. Contamination may result from the inadvertent addition of extraneous materials to the fibers during the formation of the array by the equipment used to make the array such as a loom. Contamination may also result from materials intentionally added to the array during its assembly such as tie fibers. It is preferable that any materials added to the fibers in the formation of the array be confined to areas which will be trimmed from the finished hollow fiber module.

The array 21 is fabricated by winding a continuous length of hollow fiber membrane 11 on a rotating mandrel 12 having a circular cross section. The circumference of the mandrel is chosen to be an integer multiple of the desired length of the hollow fiber membrane elements which are to comprise the finished array. The mandrel is driven by a controller 13 capable of controlling both the rotational speed of the mandrel and the tension applied to the hollow fiber membrane. The controller includes a fiber feed mechanism 14 which moves a pulley 15 parallel to the central axis of the mandrel and guides the hollow fiber membrane as it is being wound to control the spacing between adjacent fiber segments. The wound hollow fiber membrane is arranged in a single layer, with the windings being substantially parallel to one another either in contiguous contact with, or spaced uniformly apart from, one another.

When the appropriate length of hollow fiber membrane 11 is accumulated on the mandrel 12, the controller 13 stops the winding operation and one or more strips of an adhesive tape 22 are applied to the outer surface of the hollow fiber membrane segments positioned along the length of the mandrel in an orientation parallel to its axis of rotation and perpendicular to the central axes of the individual hollow fiber segments. More than one strip of tape can be used, the circumferential spacing between strips being equal to the desired axial length of the membrane fibers in the array 21. The tape extends from the first hollow fiber membrane segment wound on the mandrel to the last and preferably extends about 1 cm. beyond each end of the fiber array.

Figure 2:
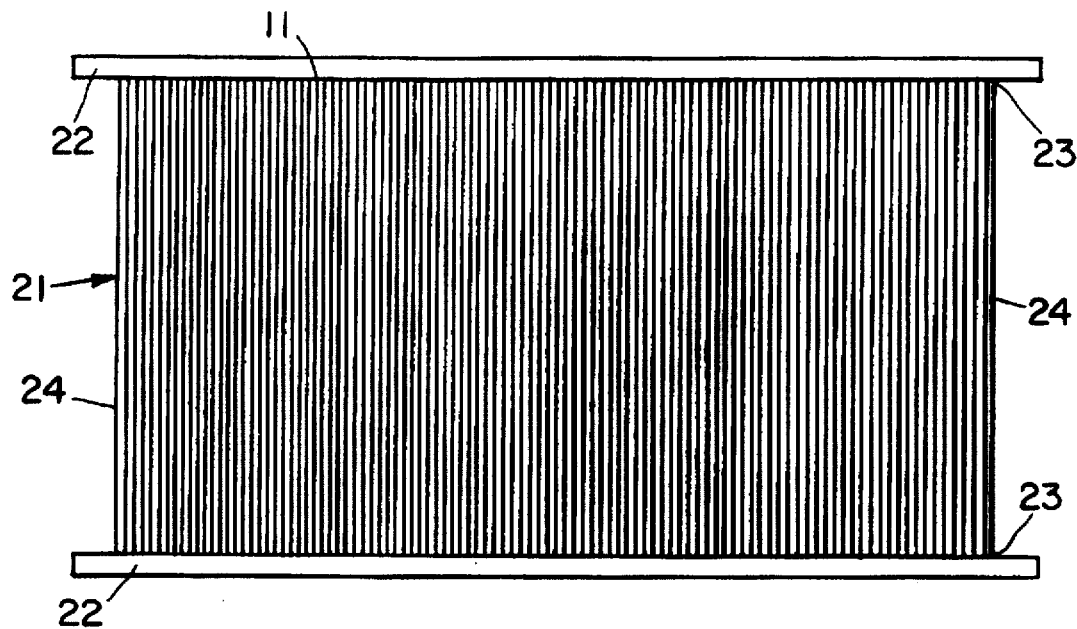
FIG. 2 is a top view of a finished array of hollow fiber membranes used in carrying out the process of FIG. 1.

A cutting guide (not shown) may be used to slit the hollow fiber membrane segments along the middle of the entire length of the tape 22 such that the hollow fiber membranes 11 remain joined together by the now halved strip of tape. In this manner, one or more hollow fiber membrane arrays are produced, with the fiber elements being secured to one another at their ends by the tape thereby making it easily removed from the mandrel 12. It should be noted that, in this discussion, the edges 23 of the rectangular hollow fiber membrane array 21 are defined as the two surfaces formed by the end portions of the individual hollow fiber membrane elements comprising the array; the ends 24 of the array are defined by the outermost surfaces of the first and last hollow fiber membrane elements in the array. FIG. 2 shows in plan view an array formed in accordance with the above procedures. In cases where one fiber array does not contain a sufficient number of hollow fibers to fabricate a hollow fiber membrane module of the desired membrane area, the arrays may be spliced together end-to-end by means of an adhesive or other bonding mechanism to form a larger array. Any number of arrays may be so spliced together in the manner described above to form a larger array having tape extensions at the edges of both ends of the array.

Figure 3:
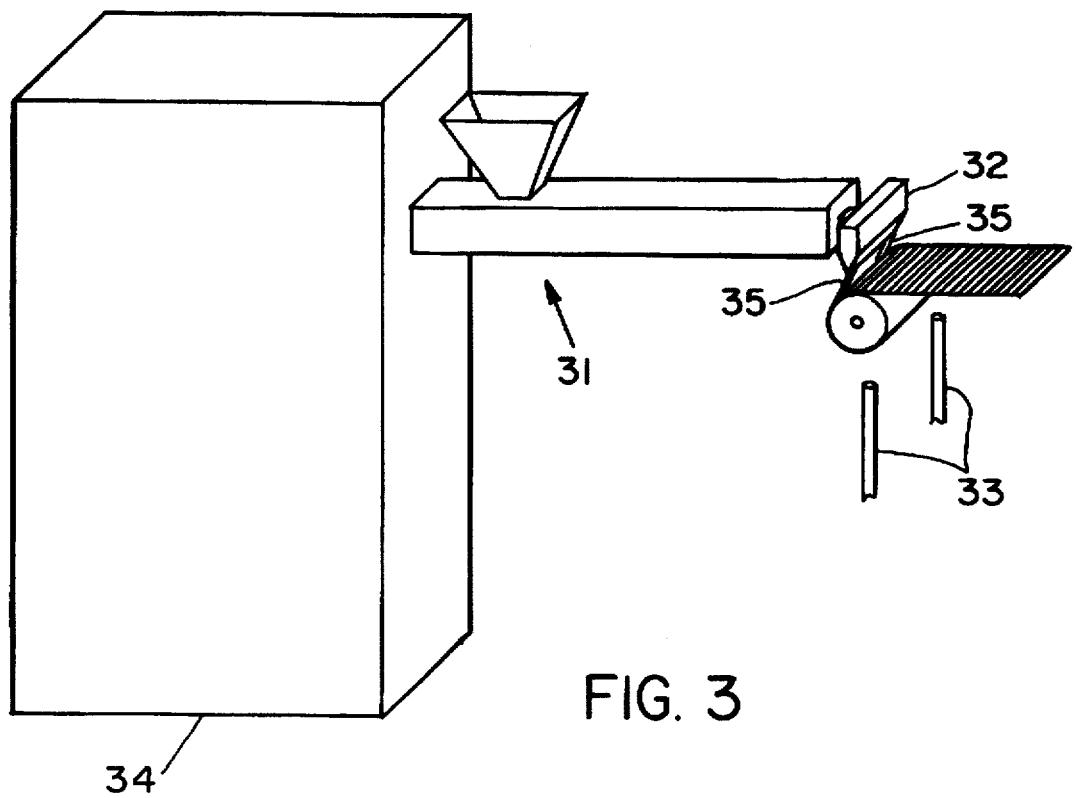
FIG. 3 is a schematic representation of the apparatus used in the process of making hollow fiber membrane modules in accordance with a preferred embodiment of the present invention.
Figure 4:
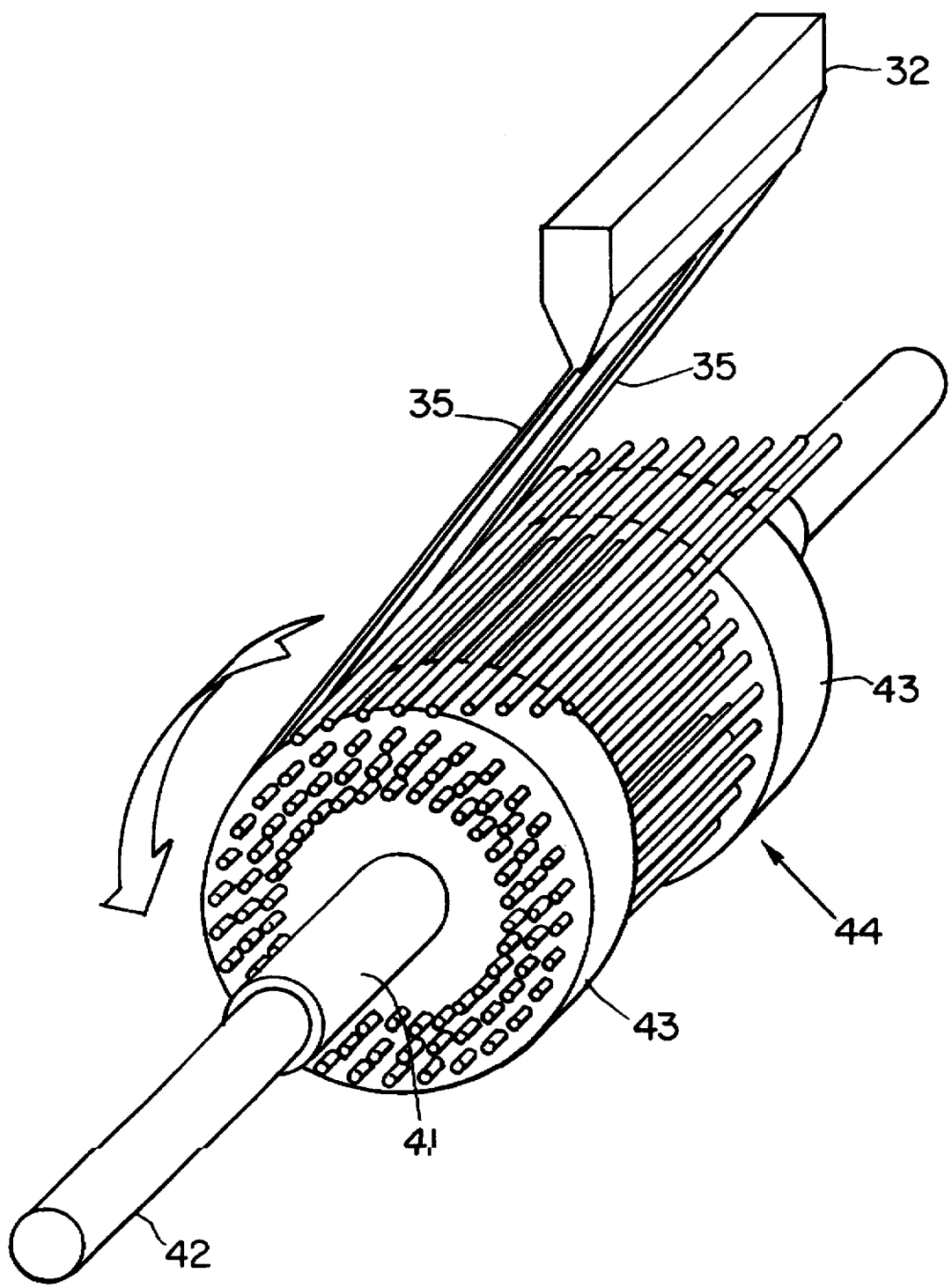
FIG. 4 is a detailed view, in perspective, showing the spiral winding sealing aspect of the hollow fiber membranes by the application of molten thermoplastic in accordance with a preferred embodiment.

The next operation in the fabrication of a hollow fiber membrane module is the winding of the fiber array into a bundle and the corresponding formation of a pair of tubesheets 43 at one or more of the edges 23 of the array 21. This process is shown schematically in FIGS. 3 and 4. A single screw extruder 31 is used to feed a thermoplastic sealing polymer to a dual slot extrusion die 32 which produces two polymer extrusions 35 in the form of a ribbon.

A suitable length of thermoplastic tube 41 is mounted on a removable winding mandrel 42 positioned below the extrusion die, with the rotational axis of the mandrel being parallel to a line connecting the two outlets of the extrusion die. Stepper motors (not shown) are used to adjust the speed of rotation and distance between the mandrel and the die. A set of gas heaters 33 mounted on a retractable slide (not shown) are used to preheat the tube 41 prior to the fabrication of the tubesheets. The functions of the various elements described above are regulated by a programmable, microprocessor-based controller 34.

In order to maintain the molten thermoplastic polymer extrusion 35 from the die at a uniform temperature, it is preferred to operate the extruder 31 at a constant speed. Maintaining a uniform fiber spacing and tubesheet width requires that the fiber feed rate remain constant and that the distance between the extrusion die and contact point of the polymer extrusion and tubesheet 43 remain constant. The previously described controller 34 in conjunction with the apparatus discussed above accomplish this result with feedback control mechanisms known to those skilled in the art.

Before the winding of the array 21 and the formation of the tubesheets 43, the tube 41 must be pre-heated using the heaters 33. This step is necessary to obtain a good bond between the tubesheet and the tube. Rotation of the winding mandrel 42 and tube is begun and the gas heaters are activated such that a hot gas stream impinges on the portions of the tube where the tubesheets will be formed. After a suitable time, the heaters are removed and the polymer extrusions 35 are applied to the tube.

Figure 5:
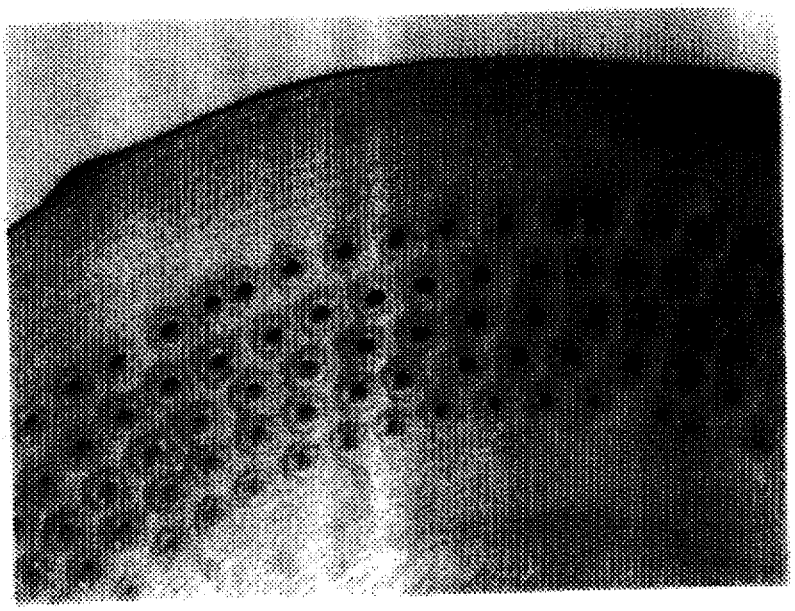
FIG. 5 is a photograph of the cross section of a tubesheet of the hollow fiber membrane module manufactured by using the spiral winding technique of FIG. 4.

Following the accumulation of approximately a one-half turn of the polymer extrusions 35 on the tube 41, the leading edge of the hollow fiber membrane array 21 is positioned under and parallel to the tube with the adhesive side of the extended strip of tape 22 facing the tube. The tape is then brought into contact with the tube outboard of the tubesheets 43 and allowed to wind up on the tube as the rotational speed and position of the winding mandrel 42 and tube are adjusted by the process controller 34. A slight tension is maintained on the hollow fiber array to keep the fibers in contact with the polymer extrusions. As the trailing edge of the array is wound up, the tape extensions are fastened to the previous fiber layer to form a fiber bundle 44. Application of the polymer extrusions may be terminated after the entire array is wound about the mandrel. Alternatively, the tubesheets may be built up to a larger diameter depending on the requirements of the rest of the module assembly process. In this case, the rotation of the winding mandrel continues as the molten tubesheets are allowed to cool. The end portions of the sealed fiber bundle can be trimmed to expose the fiber lumens and further machining may be performed to provide a means for sealing the fiber bundle into a suitable housing or the fiber bundle may be contoured to provide details suitable for thermoplastically bonding it to the components of a pressure housing of the same or a similar resin material in order to produce a hollow fiber module. FIG. 5 shows, in cross section, a tubesheet manufactured by the spiral winding technique described above.

In some instances, the cutting of the tubesheet ends obstructs the opening of some of the hollow fiber lumens with a thin web of the thermoplastic sealing resin. These obstructions can be readily removed by heating them above the melting point of the resin thereby causing the thermoplastic resin to fuse into the tubesheet. Heating may be accomplished with either a radiant heater or hot gas stream directed at the obstructed lumens.

Contrary to the prevailing view that excessive heating of the hollow fibers is to be avoided when sealing with molten thermoplastics (see, for example, the aforementioned Huang et al patent), applicant has discovered that it is possible to apply a molten polymer to form a tubesheet at a temperature much higher than that of the melting point of the hollow fiber. In a preferred embodiment, UPE hollow fiber membranes are sealed by application of either high density or low density molten polyethylene at contact temperatures greater than the peak melting point of the UPE fiber. The preferred range of contact temperatures depends on the nature of the sealing resin; contact temperatures in excess of 90° C. above the melting point of the fiber have been successfully used. Table 1 lists a number of polyethylene sealing polymers and summarizes the results obtained with these sealing polymers.

TABLE 1

| Sample | Type | Melting Point °C. Initial | Peak | Die Temperature °C. | Die Temperature °C. |
|---|---|---|---|---|---|
| Hollow Fiber | UPE | 126.8 | 137.5 | N/A | N/A |
| Dowlex 2503 | LLDPE | 115.0 | 126.7 | 210–212 | 185 |
| Dowlex 2553 | LLDPE | 118.1 | 128.5 | 230–232 | 207–209 |
| Dow 10062N | HDPE | 127.3 | 137.5 | 260–262 | 215–225 |

Applying the thermoplastic polymer at such elevated temperatures offers several advantages. Since the polymer's viscosity is substantially lowered, it is possible to penetrate freely enough around the fiber bundle before the polymer cools (and hence solidifies) to effect a reliable seal. Furthermore, in the case of a homopolymer construction a strong bond is obtained between the fiber and the tubesheet because the fiber fuses into the molten sealing resin.

The effect of the high temperature application of the thermoplastic is best shown in FIG. 5. The high temperature has caused the UPE fibers to melt, which can be shown under increased magnification by the absence of the porous membrane structures in the vicinity of the thermoplastic sealing polymer. As shown, there has been no resulting flow of fiber material and subsequent deformation of the lumen.

Figure 6:
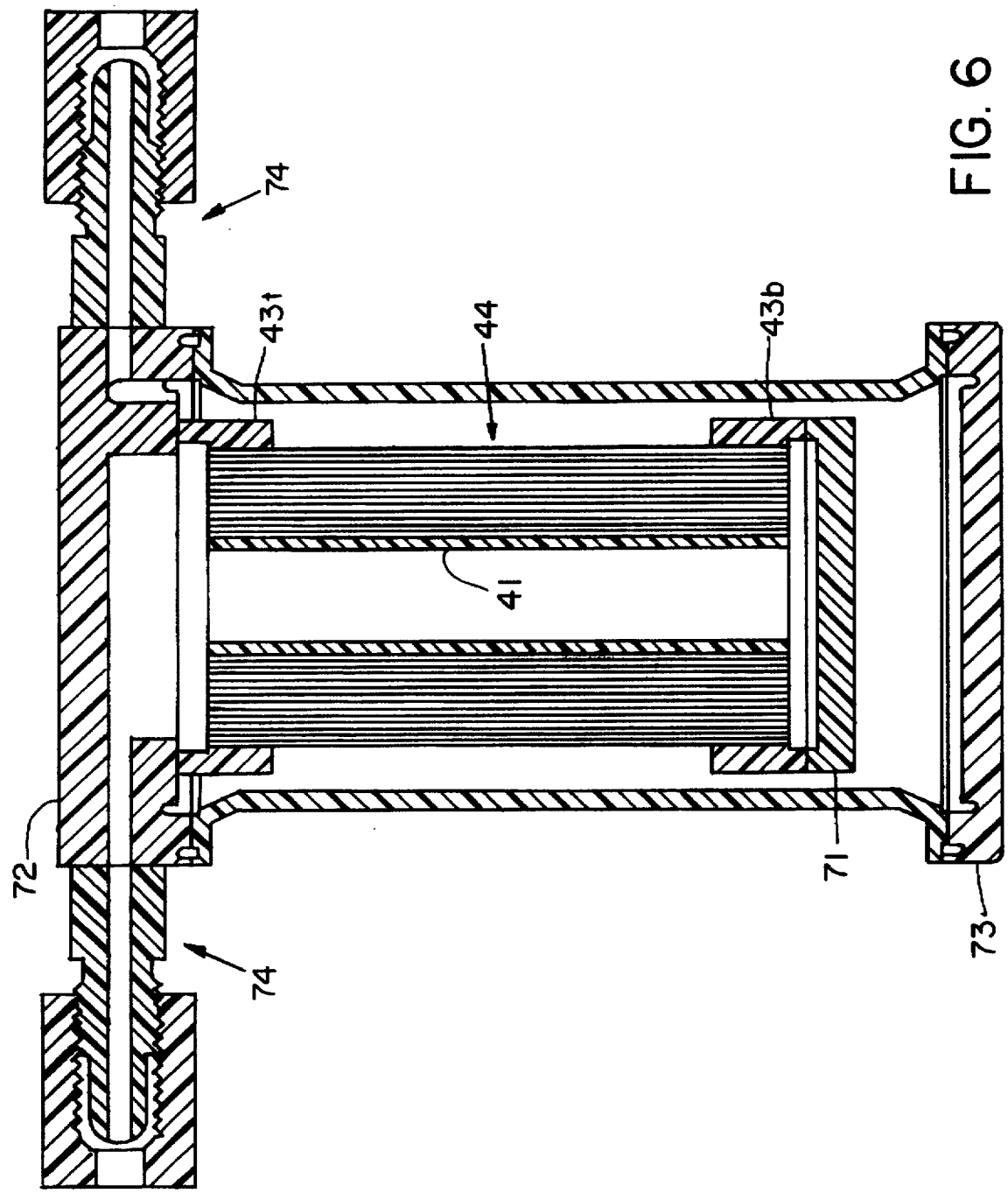
FIG. 6 is a sectional view of a hollow fiber membrane module constructed in accordance with a preferred embodiment mounted in a cartridge filter housing.

FIG. 6 shows the details of the fiber bundle 44 and corresponding tubesheets 43 (labeled in this figure as 43b and 43t to represent the bottom and top orientations shown in the drawing) which have been assembled into a homopolymer hollow fiber module. This can be accomplished by employing conventional methods of fusion bonding of plastic components. After fabrication of the bundle 44 is completed, the bottom tubesheet 43b is bonded to an inside cap 71. During use, the filtrate collected at that tubesheet is directed to a top end-cap 72 through the tube 41. The housing shell and the top tubesheet 43t of the bundle are simultaneously bonded to the top end-cap. Finally, an outside end-cap 73 is bonded to the bottom of a housing shell 74. Suitable connectors are also added to provide means of connecting the module to a feed and to an effluent line. By these means an integral, homopolymer module free of O-ring seals can be produced.

EXAMPLES

A UPE hollow fiber membrane, 800 to 850 microns in outside diameter and with a lumen diameter of 450 microns, was fabricated into an array and sealed with various molten polyethylene resins as listed in Table 1 according to the foregoing description of the invention. A Brabender Model No. 2503, ¾" extruder with a 25:1 length to diameter ratio and a 3:1 compression ratio was used to deliver molten polymer to a dual ribbon extrusion die. The extruder was powered by a Brabender Prepcenter Model D-52 drive unit with extruder temperature regulation provided by a Model 808-2504 controller. The extrusion die had two rectangular orifices, each 3 cm. wide and 0.04 cm. thick; the orifices were spaced 9 cm. apart. The distance between the extrusion die and contact point of the ribbons and tubesheet was maintained at approximately 1 cm. by the winding mandrel controller. An Inframetrics Model No. 600 infra-red scanner was used to measure the temperature of the extruded ribbons exiting the die and at the point of contact with the tubesheet.

The tubesheets produced according to the foregoing procedure were examined by sectioning and subsequent photography. The results showed that, although the temperature of the extruded polyethylene ribbons and tubesheet was well above the melting point of the UPE hollow fibers as detailed in Table 1, the fibers within the tubesheet maintained their tubular shape and the lumens remained open. See, for example, the photograph of FIG. 5.

To confirm that the extruded thermoplastic polymer created a reliable seal, the fabricated array with tubesheets was exposed to an aerosol challenge integrity test. According to this test, the bundle or finished module was challenged with a submicron aerosol with the passage of aerosol being monitored downstream of the membrane. A submicron solid particle aerosol was generated using a TSI Model 3076 Constant Output Atomizer to produce a deionized water aerosol; the aerosol was dryed by adding 9 volumes of clean dry dilution air and electrostatic charges were neutralized with a TSI Model 3012 Aerosol Neutralizer. Particle detection was accomplished by a TSI Model 7610 Cleanroom CPC (condensation particle counter) with particle counts displayed on a TSI Model 7130 Remote Processor. The total aerosol flow rate was about 35 slpm with a particle concentration $>10^4$ particles/cm$^3$ ($>10^7$ particles/liter). The bundles made in this example were all integral as evidenced by the complete absence of particles in the air downstream of the tubesheet.

ALTERNATE EMBODIMENTS

Although the embodiments heretofore described have involved the formation of an array of hollow fiber membrane elements prior to sealing with a molten thermoplastic, the principles of the present invention are equally applicable to the formation of an array one fiber at a time. In this instance, a mechanical "pick-and-place" mechanism would be employed to feed a single fiber to a location beneath an extruder such that the polymer extrusion simultaneously creates a seal and forms the array by repeating this process until an array of desired size is created.

Various other configurations of pre-constructed fiber arrays are also possible. For example, the fibers do not have to be positioned perpendicularly to the longitudinal axis of the array. Fiber array bundle arrangements may also vary in that single-ended tubesheets for short length membrane modules may be fabricated as well as multiple tubesheets. In the former case, the hollow fiber elements must be sealed at the opposite end of the tubesheet. In the latter case, intermediate tubesheets, used primarily as support members, may or may not form integral seals around the hollow fiber membranes for particularly long modules. Furthermore, multiple bundles may be produced simultaneously using integrally sealed, multiple tubesheets which are subsequently cut to form individual fiber bundles. Still further, planar laminated arrays are also contemplated to be within the purview of this invention, in which case rectangular fiber arrays may be mounted on top of one another. The use of woven arrays is also possible.

With regard to the manufacture of a finished module, other means for sealing the bundle to the module may be employed, as for example, with the use of O-rings.

Also, the sealing resin has been described throughout as a pure thermoplastic polymer. However, mixtures of thermoplastic polymers, having additives such as viscosity reducing agents or dilutents and adhesive agents, may be used and are intended to be covered under the definition of "thermoplastic polymer."

Additional modifications will become apparent to those of skill in the art without departing from the scope of the present invention as defined in the accompanying claims.

I claim:

1. A method of making an all thermoplastic hollow fiber membrane module comprising the steps of:

contacting a plurality of hollow fiber membranes made from polymers having a molecular weight greater than 500,000 Daltons with an extrusion of molten thermoplastic polymer having a molecular weight substantially less than the molecular weight of said fiber polymers to form a substantially parallel array of said membranes;

said thermoplastic polymer being heated sufficiently above its melting point such that it is applied to said membranes at a contact temperature higher than the melting point of said membranes serving to cause said molten polymer to flow around said hollow fiber membranes while simultaneously causing at least partial melting of the hollow fiber membrane walls and to form an integral bundle of hollow fiber membranes; and cooling said molten polymer to form a fluid-tight seal between a first and second region of said hollow fiber membranes.

2. The method of claim 1 wherein said array is formed prior to contacting said membranes with said molten polymer by bonding said membranes together in contiguous relation.

3. The method of claim 2 wherein said bonding is accomplished by heat sealing said membranes with or without a strip of molten polymer.

4. The method of claim 2 wherein said bonding is accomplished by coupling said membranes with an adhesive.

5. The method of claim 1 wherein said array is formed prior to contacting said membranes with said molten polymer by bonding said membranes in spaced apart relation.

6. The method of claim 1 wherein said fiber polymers and said molten thermoplastic polymer are homopolymers.

7. The method of claim 1 wherein said fiber polymer is ultra-high molecular weight polyethylene.

8. The method of claim 1 wherein said fiber polymer is polytetrafluorethylene.

9. The method of claim 7 wherein said molten thermoplastic polymer is low density polyethylene.

10. The method of claim 8 wherein said molten thermoplastic polymer is a fluorinated or perfluorinated polymer.

11. The method of claim 1 wherein said contact temperature is greater than 10° C. above the melting point of said fiber polymer.

12. The method of claim 11 wherein said contact temperature is greater than 50° C. above the melting point of said fiber polymer.

13. The method of claim 1 wherein said extrusion of molten polymer constitutes a thin ribbon deposited in a defined zone near one end of said membranes.

14. The method of claim 13 including the step of extruding a second thin ribbon of molten thermoplastic polymer near the opposite end of said membranes.

15. The method of claim 1 including the steps of forming a substantially parallel array of said membranes and subsequently spirally winding said array about an axis which is substantially parallel to the longitudinal axis of said hollow fiber membranes while simultaneously applying said extrusion of molten thermoplastic polymer to form a circular bundle of integral fibers.

16. The method of claim 15 including the step of continuing to apply said extrusion after said circular bundle is formed to create a tubesheet of predetermined diameter about at least one end of said hollow fiber membranes.

17. The method of claim 16 including the step of cutting the tubesheet orthogonally to the longitudinal axis of said hollow fiber membranes to form said circular bundle with a flat end surface having exposed lumens.

18. The method of claim 17 including the step of mounting said bundle into a cartridge housing.

19. The method of claim 18 wherein said bundle is mounted into said housing by fusion bonding.

20. The method of claim 17 wherein said membranes, said tubesheet and said housing are homopolymers.

* * * * *